United States Patent [19]

Howlett

[11] 3,837,511
[45] Sept. 24, 1974

[54] METHOD OF LOADING AND UNLOADING ARTICLES IN A STORAGE APPARATUS

[76] Inventor: Newel Howlett, 1401 Hillside Pl., Las Vegas, Nev. 89104

[22] Filed: Feb. 9, 1973

[21] Appl. No.: 331,018

Related U.S. Application Data

[62] Division of Ser. No. 191,947, Oct. 22, 1971.

[52] U.S. Cl. ............................ 214/152, 214/16.4 C
[51] Int. Cl. .............................................. B65g 1/06
[58] Field of Search ........ 214/16 B, 16.4 R, 16.4 C, 214/152, 16.1 CC

[56] References Cited
UNITED STATES PATENTS

| | | | |
|---|---|---|---|
| 2,679,323 | 5/1954 | Patterson | 214/16.4 C |
| 2,931,483 | 4/1960 | Gibbons | 214/16.4 C |
| 3,079,015 | 2/1963 | Sinclair et al. | 214/16.1 R |
| 3,458,062 | 7/1969 | Boissevain et al. | 214/16.4 C |
| 3,719,288 | 3/1973 | Schmitt et al. | 214/16.4 C |

FOREIGN PATENTS OR APPLICATIONS

| | | | |
|---|---|---|---|
| 231,360 | 5/1963 | Austria | 214/16.4 C |

Primary Examiner—Robert J. Spar
Assistant Examiner—R. B. Johnson
Attorney, Agent, or Firm—Jerry R. Seiler

[57] ABSTRACT

An improved apparatus and method for storing and handling articles and particularly refrigerated or frozen foods comprises a series of adjacent elongated storage compartments having rollers extending along the length of the bottom of each compartment on which rollers lie a row of flat plates which may be advanced along the rollers and on the upper surface of which plates materials are stacked. Plate advancing means are provided by a guided shaft extending substantially along the length of each compartment which shaft has attached thereto a series of catch members for contacting catch member receiving or stop means located on the underside of each of the plates; an operator advances the row of plates toward one end of the compartment by pulling the end of the shaft.

3 Claims, 5 Drawing Figures 3,837,511

METHOD OF LOADING AND UNLOADING ARTICLES IN A STORAGE APPARATUS

This is a division, of application Ser. No. 191,947, filed Oct. 22, 1971.

BACKGROUND OF THE INVENTION

Better and more efficient apparatus and methods for storing, handling and retrieving materials and especially boxes of materials have been sought. Conventionally, usual methods of storing goods of the bulk type, that is which are boxed or in containers, is to place them on pallets and move the pallets into the storage building. The goods are stored on the pallets along the sides of the room and in rows separated by isles in the interior of the storage chamber.

The use of pallets for stacking and handling, and storing goods is undesirable for a number of reasons. For example, such a method requires isles of sufficient width so that fork-lifts for moving the pallets can enter the storage chamber and manuever therein so as to place the pallets where desired. Unless the boxes or containers stacked on the pallet are uniform so that the stack is rather tightly consolidated, in moving the pallets there is always the danger of a container falling which could result in injury to personnel in the vicinity or otherwise damage the materials.

Particularly in the storage of food materials under refrigerated or frozen conditions, efficiency of storage presents additional problems. Since the storage chamber or room is to be cooled, unused air space increases costs of refrigeration. Even more important is proper circulation of refrigerated air around the containers or groups of containers so as to insure more uniform cooling or freezing of the goods therein. Again, conventional methods wherein such goods are placed adjacent the interior walls of the storage chamber, proper air circulation is not achieved.

A further and most important aspect in handling, storing and retrieving frozen or refrigerated foods is in assuring rotation. Thus, it is extremely important that most stored food products not be allowed to age so that first in-first out handling of such products is essential. Yet, where such products are stored against the interior walls of a storage chamber, it is usually necessary to handle and re-handle the goods to insure that the oldest stored goods are brought forward for exposure so that they may be used to fill orders first or as soon as possible. Each time the containers must be handled to insure proper and efficient rotation, handling and storage costs are increased and the efficiency of such a system is poor, at best.

It is to the substantial elimination of the problems set forth above that the present invention is directed. The apparatus and storage system of the invention hereof is intended to maximize storage space utilization, particularly where food products are to be stored under refrigerated or freezing conditions. The system is also intended to eliminate the necessity of fork-lifts or other vehicles, pallets of the type normally used for storing containers thereon, and particularly designed to minimize handling requirements of the goods once they are placed in storage. Further, because of the apparatus, positive rotation of materials stored is achieved with the only handling requirements being to place the containers into a storage compartment at one end, and unload them at the other end. In addition, because of the type of structure utilized in the apparatus of the invention, and the manner in which it is located within a storage room or facility, maximum space is utilized while at the same time cool or refrigerated air contact with the containers is also maximized thereby assuring that the goods are properly cooled. These as well as other advantages will be evident from the following description of the invention.

SUMMARY OF THE INVENTION

The present invention relates to a method for storing and handling articles, and particularly foods which are stored in cartons under refrigerated or freezing conditions. In general, the method comprises bringing the cartons or articles or merchandise into the storage facility on a conveyor belt or belt driven rollers, removing the cartons from the conveyor system and immediately thereafter placing them into one end of a storage compartment. The storage compartments which are preferably of various widths, so as to accommodate varying sized cartons, are located side by side and are of substantially the same length so that the openings at each end of the compartments communicate with a walkway space between the compartment openings and the conveyor system. The bottom of each compartment is provided with roller means, preferably of the strip roller type which extend substantially the entire length of each compartment. On the roller means are placed plates which are substantially flat and which extend nearly the width of the storage compartments in which they are used. Containers of materials to be stored are placed on the upper flat surface of the plates at one end of the compartment and the plate is then pushed forward on the roller means toward the other compartment end. As each plate is pushed forward, another plate is then placed on the roller means, and goods are stacked thereon until that plate has been filled to the desired extend with stacked containers. This operation may be continued and the goods may be thereafter unloaded at the opposite end of the compartment.

A novel means of advancing the plates from the unloading end of each storage compartment is provided as will be explained further hereinafter. Such means provides for moving the entire row of plates in a storage compartment with a minimum of effort. Yet, the storage compartments, plates and roller means are substantially level so that although they can be advanced with relative ease, they do not move unless they are purposely advanced. Further, since the plates are maintained substantially level, there is little or no tendency for the cartons stacked thereon to tip or fall over and accordingly the stacked containers remain in a uniform and orderly group. These as well as other advantages and features of the invention will be pointed out and become evident from the detailed description.

DETAILED DESCRIPTION OF THE INVENTION

Figure 1:
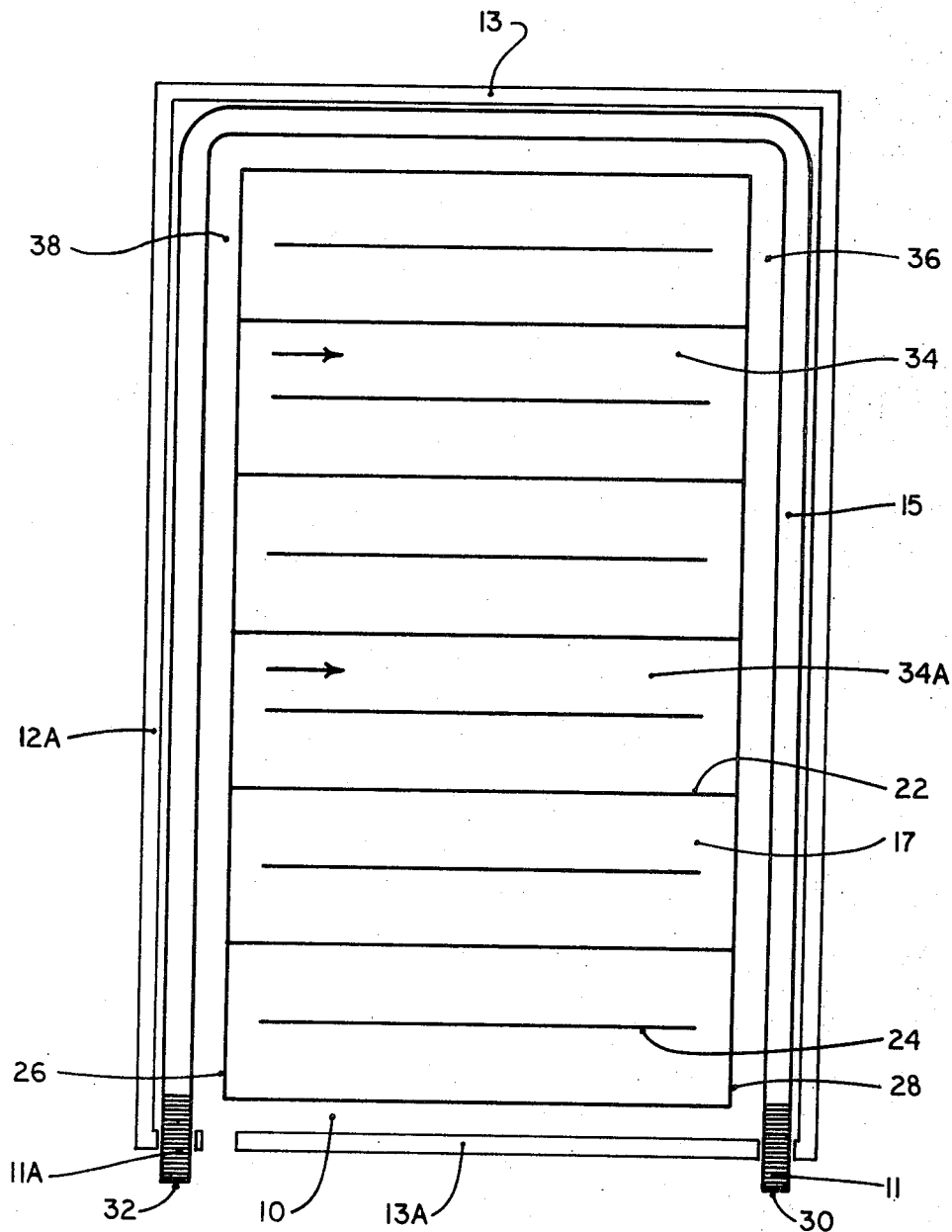
FIG. 1 is a top plan view showing generally and schematically the invention.

Referring now to FIG. 1, there is shown generally and schematically a storage chamber confined between sidewalls 12 and 12A and endwalls 13 and 13A. Adjacent these walls is a conveyor system 15 which may comprise a conveyor belt or rollers which are belt driven for transportation of boxes or containers of materials thereon, only a portion of conveyor rollers 11 and 11A are shown. Conveyor system 15 includes an input end 30 and an output end 32. Containers may be directed into the storage chamber at input end 30 from an exterior point or vehicle which is to be unloaded. It will be noted that conveyor system 15 lies slightly or somewhat separated but adjacent the sidewalls and one end wall of the storage chamber.

The storage apparatus, designated generally as 10, and which will be described in more detail hereinafter, includes a series of storage compartments 17 each having opposite open ends 26 and 28. Each storage compartment may be divided by a separator 24 as shown, where space allows and where the individual storage compartment is wide enough so as to provide for two compartments of ½ size, although this is not critical and is optional. The storage compartments are preferably prepared of an iron or other metal strip frame whereby cross members extend horizontally both across the top and bottom of the structure and upright members and corner posts are all welded together to form a unitary unit which is structurally sound. Where metal strips are used to provide the sides of the storage compartment, the structure will still be relatively light weight and cartons or other stacked materials within the compartments can be readily observed from a side view or position. Although the actual materials used in constructing the framework of the storage compartments is not particularly critical and may comprise wood, sheet metal and the like, the use of metal strips will usually offer more advantages and is therefore preferred. Further, since the storage compartments are preferably intended to be used in cold storage chambers, where freezing or sub-freezing temperatures may be present, the use of plastics or wood materials may not be desired.

As previously noted, the cartons to be stored may be placed at input end 30 of conveyor system 15 and thereafter transported automatically along a conveyor belt rollers 11, only a portion of which are shown, into the storage room or chamber. Thereafter an operator or operators located at the various positions along walkway 36 between conveyor system 15 and the storage racks will pick up the cartons and place them within the various storage compartments at the open and communicating with the walkway space. Because the storage compartments have open ends adjacent to the conveyor system, the operator can easily place the desired cartons into the desired compartment, according to size, type of product, or any other efficient storage system desired. It should also be noted that stop blocks may be placed along the conveyor system so that incoming cartons may be stopped at the desired locations in front of certain storage compartment openings. Thus, the operator may more easily have time to place cartons in the desired compartments without having to unduly move along the length of walkway 36 during the compartment loading phase.

The opposite compartment end 26 is the location at which cartons are unloaded from a compartment when they are to be shipped out or removed from the storage chamber. This is accomplished by simply removing the boxes or cartons from that end of the storage compartment and placing them on the adjacent conveyor system. The cartons will be advanced to output conveyor end 32 for delivery.

Although the conveyor system 15 is shown having an input end 30 and output end 32, this is not necessary and the conveyor may be reversible so that end 30 is used for both bringing cartons into the storage chamber and for removing them for delivery. This may be preferred where both incoming and outgoing cartons are desired to be handled at a single location. Further, the conveyor system may be substantially continuous whereby another portion of a conveyor belt may be directed from the terminal end 32 to adjacent terminal end 30 whereby the conveyor may be run or operated in one direction only without the need for reversing the conveyor system. Such modifications or embodiments may be utilized as desired as will be appreciated by those skilled in the art without effecting the operation or concept of the storage system described herein.

A portion of the storage compartments may be used for moving plates from the unloading end area of the storage compartment structure adjacent walkway 35 to the other end. Two of such compartments 34 and 34A are illustrated with plates being advanced in the direction of the arrows shown. The purpose for this is to provide means for returning the plates from the end at which the cartons are unloaded to the loading storage compartment end areas. Otherwise the plates which have been unloaded would have to be hand carried or otherwise transported around the walkway which may be somewhat inconvenient and burdensome. Accordingly, it may be desired to utilize one or more of the storage compartments as shown solely for the purpose of easily returning unloaded plates to the loading end of the storage compartment structure where full utilization of all of the compartments of the system for storing goods is not required.

It will also be noted that the storage compartment structure 10 is located in the central area of the storage chamber defined by the side and end walls of the building. Such a concept utilizes maximum space for storage of cartons and minimizes free air space within the structure. Thus, except for the conveyor system and the small area necessary to provide a walkway around the storage compartment structure 10, the remainder of the interior of the storage chamber or building may be used for storing cartons thereby limiting the amount of unused space. In addition, although not shown, shelves may extend into the storage chamber from side walls 12 or 12A or the end walls so that smaller boxes or cartons or boxes which are incompletely filled with materials may be placed thereon and yet easily retrieved by an operator in filling orders to be placed on the conveyor system.

The storage system may also include means for detecting first and/or last boxes of orders to be placed in a vehicle for delivery. For example, an operator working in walkway 38 may unload all the necessary cartons for filling a first order from various storage compartments onto the conveyor system and place a phototape or other detectable material on the last carton of that order. Thereafter, the order cartons will be carried around the conveyor system, assuming it to be reversible, toward terminal end 30. Second and subsequent orders may then be placed on the conveyor system. When delivery vehicles arrive for loading, the operator turns on the conveyor system which will bring the boxes or cartons to terminal end 30 until the last box of the first order has arrived there. Thereafter, a phototape sensing means will turn off the conveyor system. The system can then again be turned on and the order filling operation continued in the sequence above described. Meanwhile, as this is occuring, an operator may still remain in walkway 38 and place further orders on the conveyor system as desired. Again, the use of the system and various modifications thereof will be understood to those skilled in the art and need not be described in further detail herein.

Figure 2:
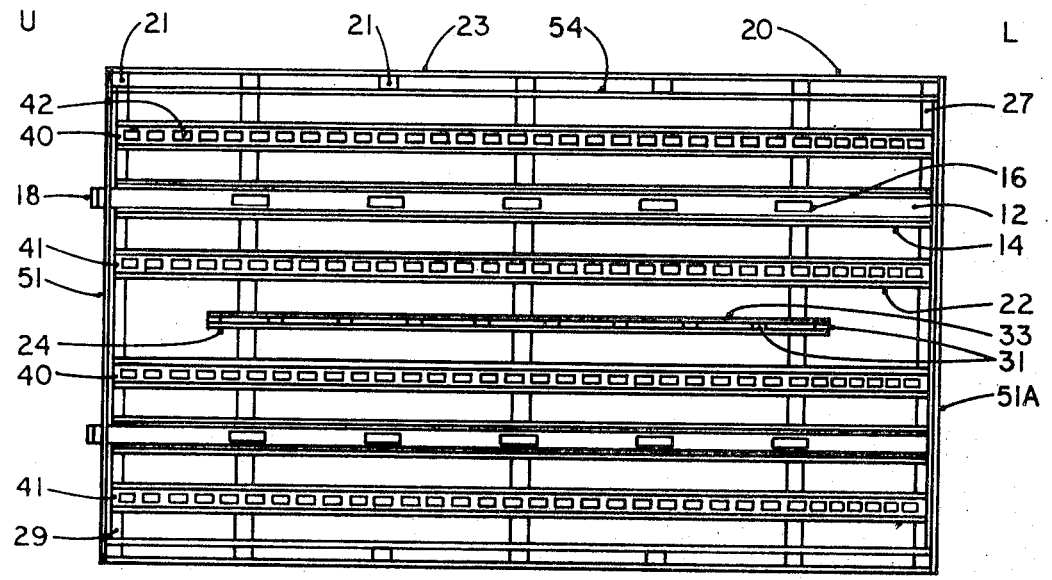
FIG. 2 is a more detailed planned view of the base area of a storage compartment of the invention.
Figure 5:
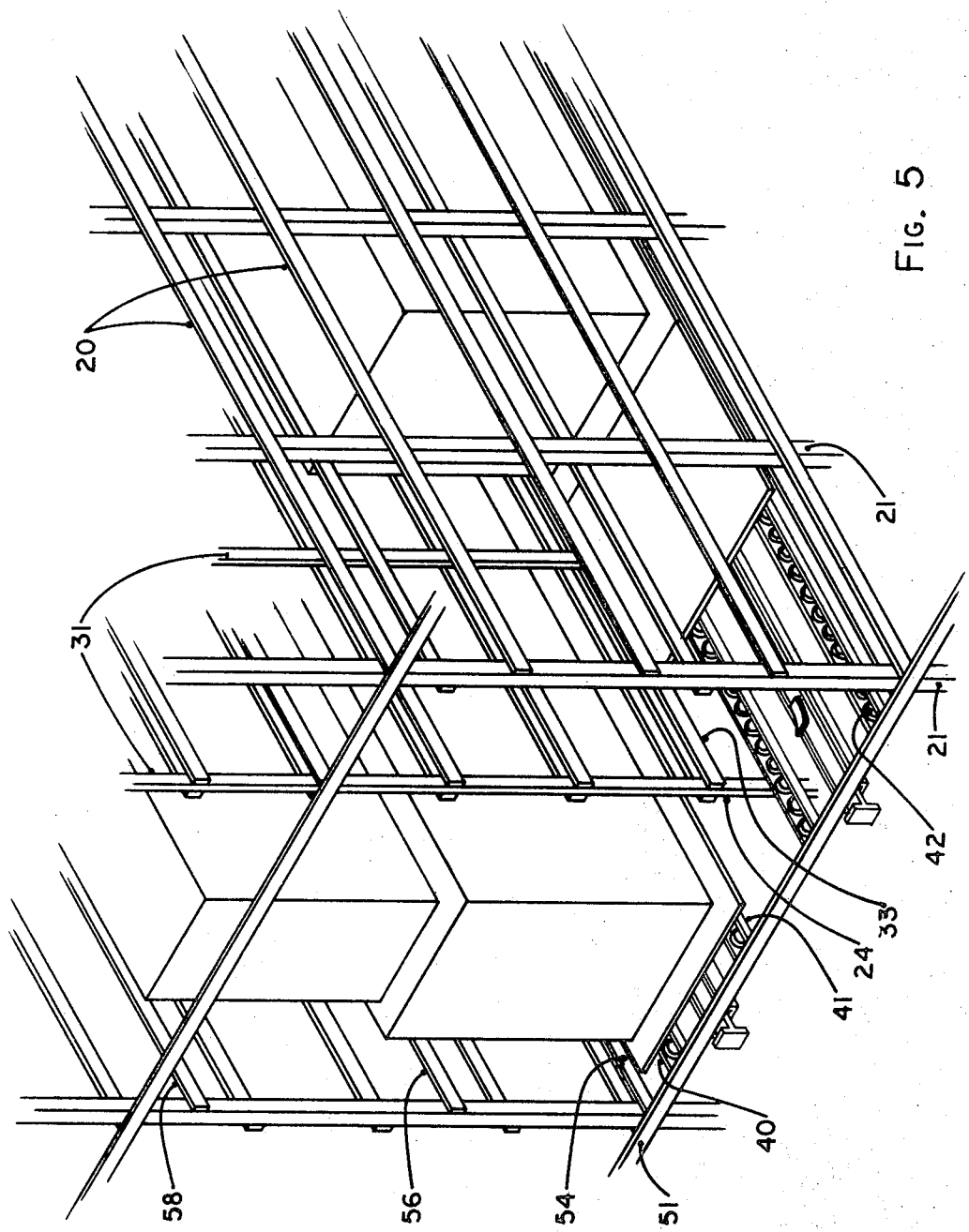
FIG. 5 is a perspective view of the apparatus and storage compartment.

Referring now to FIGS. 2 and 5, two storage compartments are shown separated by divider 24 which extends vertically from top to bottom of the structure. At the bottom of each storage compartment are a pair of strip rollers 40 and 41 extending substantially the length of the compartment which is defined between side 23 and separator 24. The sides comprise a number of upright members or posts 21 to which are attached metal strips 20. Again, it is preferred to use metal strips for example, from ¼– 1 inch material so that containers within the storage compartment may be viewed easily from any angle. Further, the use of the metal strips which are preferable welded or riveted to uprights or posts 21 will provide structural rigidity and uniformity to the storage compartments.

Each strip roller terminates at the two open and opposite ends of the storage compartment and are provided with a plurality of rollers 42. A strip roller may have any number of rollers thereon it being only critical that a sufficient number of rollers are provided so that the plates which rest on the upper surface of the rollers are at all times provided with sufficient support and are in contact with the rollers for advancement along the storage compartment. It will also be noted that divider 24 is composed of upright members 31 and metal strips 33 and which dividers are attached to top and bottom cross members of the storage compartment structure. In addition, it will be noted that the separator 24 doe not extend completely along the length of the storage compartment but it instead terminates short of the open end so as to provide more room for an operator to handle containers and boxes in loading and unloading them into the compartment. However, this is not particularly critical but is preferred in order to assist in the utilization of the apparatus.

Cross members 27 and 29 shown at each end of the storage compartment are also preferably metal such as angle-iron or other suitably shaped metal strips or members attached by riveting or welding to the corner posts of the structure. These and intermediate cross members are also shown extending across the storage compartments but are present only at the top and bottom thereof so as not to interfere or cross through the storage compartment itself. In this manner, although extreme rigidity and uniformity of structure requirements are met, the storage compartments themselves are completely open except for the presence of a divider 24, which is optional, so that full utilization of the space within the compartment is available.

Figure 3:
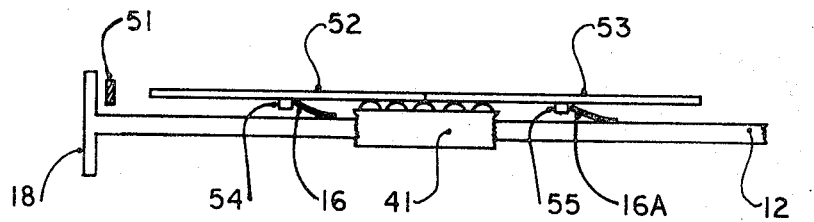
FIG. 3 is a side elevational view of a portion of the plate advancing means of the invention.
Figure 4:
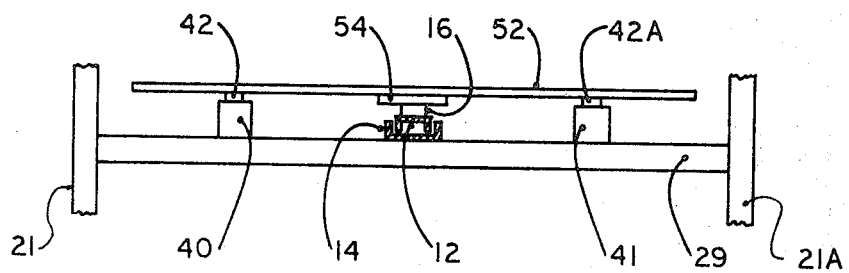
FIG. 4 is a front elevational view of the base area portion of a single storage compartment of the invention.

Referring now also to FIGS. 3 and 4, the novel means for advancing the plates upon which the cartons are to be stacked are shown. FIG. 3 illustrates the portion of the plate advancing means in which strip roller 41 has been partially cut away and other structural members of the storage compartment have been removed to more clearly show the desired features. Shaft 12 is shown, partially cut away having a handle member 18 at one end thereof which may be grasped by an operator in order to pull the shaft toward him. On the upper surface of shaft 12 are located catch members 16 and 16A. It should be appreciated that only two of the catch members are shown and that along the full length of shaft 12 there are other such catch members at least equal to the number of plates which the storage compartment will hold when filled. The catch members are preferably made of a leaf-spring type of material which is biased upwardly. One end of the leaf-spring is attached to the upper surface of shaft 12 as shown and the opposite leaf-spring end extends and is biased upwardly toward the plates. It is also noted that the upper surface of the shaft is lower than a horizontal plane extending across the upper surface of the rollers. In other words, the shaft, except for the catch members, does not interfere with the lower plate surface.

Plates 52 and 53, which only represent two of a number of plates which will normally be present along the bottom of a storage compartment, are each provided with a portuberance or stock block 54 and 55 extending downwardly from the bottom surface of the respective plates. It should be remembered that the plates will be advanced towards the handle end of shaft 12 so that cartons on the plates will be unloaded from the storage compartment at that end. Accordingly, the normal advancement of the plates as well as the goods thereon will be from right to left of FIG. 3 as well as FIGS. 1 and 2. Thus, as previously explained, as goods are placed on individual plates at the loading end of each of the storage compartments (FIG. 2), they are advanced from right to left along the storage compartments by simply pushing the stack of containers or the plate lightly which will cause the plate to roll along the strip rollers toward the opposite end U of the compartment.

Referring again to FIG. 3, leaf-springs 16 and 16A, as well as the others located along the upper surface of shaft 12 are preferably spring-like metal pieces having one end secured to the upper shaft surface and the other end biased upwardly therefrom and at a height at least above the bottom surface of the stop blocks. The leaf-springs are depressable so as plates 52 and 53 are advanced right to left, when contact is made by each of the leaf-springs with stop blocks 54 and 55, the leaf-springs will simply be depressed and offer little resistance to the continued advancement of the plates. Thereafter, as an individual stop block depresses and passes over a leaf-spring, the leaf-spring will then return to its normal upwardly biased rest position above a plane extending along the bottom stop block surfaces.

When an operator wishes to unload cartons from the unloading end of a storage compartment where a loaded plate has not yet reached the end, he will simply grasp handle 18 or shaft 12 and pull it toward him. At that time, shaft 12 will be advanced until a catch member, for example catch member 16, contacts stop block 54 extending from the bottom surface of plate 52. All of the plates in any one storage compartment are essentially the same dimensions, and preferable all of the stop blocks attached thereto are located in the same relative position on each of the bottom surfaces of the respective plates. The catch members are preferably separated at a distance that is equal to the distance between stop blocks of adjacent plates when aligned end to end in the compartment. Thus, when one of the catch members contacts a stop block, all of the remaining catch members will similarly be in the contact with a stop block of the plate directly above it. As the shaft is further pulled by the operator, because of contact of the individual stop-blocks with the catch members, the entire row of plates and cartons thereon will be advanced toward the operator as he continues pulling. Advancement of the plates and cartons will continue until the plate nearest the operator has reached the end of a storage compartment. It may be preferred to provide a plate stop member 51 (FIGS. 3 and 5) at the end of each compartment so that further advancement of the plates will be avoided as the leading edge of the first plate contacts the stop member.

Once the operator has unloaded all of the cartons on the first plate (plate 52), it is removed from the storage compartment and preferably taken to a return compartment in which advancement of a plate or plates therealong is in the opposite direction for return to the loading end of the storage compartment structure. This again is shown in FIG. 1 with compartments 34 which are not used for storing containers but which are provided with the same shafts having catch members attached to the upper surface, but which have a handle at the opposite and, i.e., the loading end of the storage compartments. When an operator wants to retrieve the plates at the loading end of the storage compartment structure it may be easily accomplished by simply pulling on the shaft handle and the plates will be advanced toward him.

When the first plate has been advanced until it has come to rest or stops at the unloading end of a storage compartment adjacent to the operator, he may then push shaft handle 18 away from him whereby it will not project significantly out into the walkway in which the operator is working. For the purpose of limiting the extent to which shaft 12 can be pushed into the storage compartment structure, again it will be desirable to have handle 18 extend upwardly far enough so that when it is pushed to the desired extent it will stop against stop member 51. However, this is not critical and it should be understood that handle 18 may be formed in any desired shape and may consist of a pull ring or other similar or equivalent shape or form that can be easily grasped by an operator. Any stop means may be used such as a cross member either above or below shaft 12 at the handle end.

In further describing the use of the apparatus, once the first plate has been unloaded and removed from the unloading end of the storage compartment, an operator will then again pull shaft 12 toward him whereby the catch members will again contact or index with the plate stop blocks and pulling will be continued until the next plate in succession is brought to the unloading end of the storage compartment. This operation will be continued with removal of unloaded plates from the storage chamber until all of the desired cartons necessary to fill an order or orders have been unloaded. Again, as previously explained, the operator should push handle 18 in shaft 12 away from him once the succession plate has been advanced to the unloading end of a storage compartment.

The stop blocks may be simply small blocks of metal welded or otherwise attached to the bottom plate surface and are shown projecting downwardly from the bottom surface of the respective plates. However, other catch member receiving means may be used. For example, instead of incorporating a stop block, the bottom surface of the plates may be grooved or notched whereby an upwardly extending catch member end may be received in the groove. Accordingly, any equivalent means may be present on the respective plates to achieve the same purpose for advancing the plates from one end of a storage compartment to another by pulling the shaft. Further, the use of leaf-springs as catch members cooperating with catch member receiving means although preferred, is not critical and other equivalent catch members may be used. However, whatever type of catch members are used, they are to be spaced properly along the shaft so that when one of the catch members is in contact with the catch member receiving means, other catch members will similarly be received. In this manner, the entire row of plates may be pulled toward an operator at one time it being understood that the plates will lie end to end along the row.

Referring now to FIG. 4 illustrating the bottom portion of a storage compartment and viewing from the unloading end thereof toward the opposite end, plate 52 is shown resting on rollers 42 and 42A which extend from strip rollers 40 and 41 respectively. The distance between strip rollers 40 and 41 is not particularly critical so long as they are sufficient to support a plate resting thereon. Thus, the strip rollers are preferably spaced on either side of the center of the storage compartment supported by cross member 29 which in turn is attached to terminal uprights 21 and 21A. In approximately the center of the storage compartment width is shaft 12 which is seated in and guided along guide member 14 (see also FIG. 2). It will be noted that shaft 12 is composed of an inverted U-shaped angle-iron or the like whereas the guide member 14 is simply a slightly larger angle-iron which has been turned upright. For example it may be convenient to utilize a 1 inch wide angle-iron for shaft 12 and 1½-inch wide angle-iron for guide member 14 in constructing the apparatus. Further, the relationship of catch member 16 and stop block 54 from this view may be observed. It should also be noted, referring also to FIG. 3, that the end of catch member 16 attached to the upper surface of shaft 12 may be so secured in any manner, such as by welding, riveting, bolting or the like. Such features and modifications will be appreciated by those skilled in the art and are not necessarily critical to the inventive concept disclosed herein.

FIG. 5 is a perspective view showing a portion of the storage apparatus of the invention and particularly the relationships of the structural components including upright and corner posts, cross members, etc., cartons stacked on plates are also shown. It should be appreciated that the height and width of a storage compartment is not critical and may be varied as desired as to accommodate different sizes of cartons. However, it will be preferred that the bottom portion and the cross members which support the strip rollers, etc. are preferably aligned so that plates in adjacent storage compartments lie in substantially the same plane. Although this is not critical, it may be desirable for the plates upon which cartons are stacked to be at substantially the same height so that an operator can more easily handle the goods and perform his tasks of unloading and loading. Further, the storage compartments may be placed above one another again, using the unitary construction as generally disclosed herein to advantage. It may also be desirable to utilize a second story of storage compartments whereby the upper structural members of the storage compartments on the lower floor will serve as the support for the second story walkways, conveyor systems and storage compartments, assuming space permits.

An important feature of the appartus of the invention is that the storage compartment is such that the strip rollers are substantially parallel and substantially horizontal. Such a feature is important to avoid any slant and substantial free movement to the plates located thereon so that the plates will come to a rest position unless urged either by pushing against the plates or containers loaded thereon or by pulling the shaft as previously explained. For example, if the roller strips were slanted toward the loading end of a storage compartment, it would be difficult to push them forward and when let go the plates would simply fall back toward the loading end of the compartment. Further, it would be much more difficult to advance a fully loaded row of plates towards an operator by pulling on a shaft against gravitation forces. In addition, if the roller strips were slanted towards the unloading end of a storage compartment, when a first plate was placed on the rollers at the loading end, it would have to be held by some means until it was loaded, and if inadvertently released, it would roll the entire length of the storage compartment. Due to acceleration caused by gravitational forces, the boxes loaded would likely tumble off when the plate stopped against a stop member at the unloading end. Obviously, such a feature would not only likely cause damage to the container and materials therein but if an operator were standing at the unloading end he could be injured by falling containers. Thus, to avoid any such disadvantage, it is an important feature that the roller strips and the plates be substantially horizontally level. Also, with the use of horizontally lined plates and particularly at the time of loading, containers and boxes may be placed thereon in stacked and uniform and compact manner and will remain in such a compact formation and stack throughout the storage as well as during the advancement of plates from the loading to the unloading end as described herein above.

Although the apparatus has been described as incorporating strip rollers, any equivalent rollers may be used so long as they achieve the same purpose and have upper roller surfaces lying along a substantially horizontal plane. It will also be convenient to provide a cross strip shown as 51A, FIG. 2, along the loading end of each storage compartment. The upper surface of such a cross strip may lie slightly above the upper surface of a plate edge lying adjacent thereto in a manner similar to that shown for plate stop member 51 and plate 52 in FIG. 3. When loading a plate, the end of the plate nearest the operator may be elevated and resting on the stationary cross strip, the plate will be stabilized and will not have a tendency to move about along the rollers as cartons are stacked thereon. Further, since the cross strip is only slightly elevated, say 1/4 inch above the normal horizontal plate surface, the slight tilt of the plate during loading will not be such as to cause cartons loaded thereon to slide significantly or at all because of carton and plate surface friction. Yet, such a means for stabilizing a plate during loading will be of assistance to an operator. Once the plate is loaded, it may be easily pushed to slide off of the cross strip onto the rollers.

A further useful embodiment, shown in FIG. 5, is to provide additional or sufficient guide strips 54, 56 and 58 along the interior side of each storage compartment and substantially the length thereof. Such strips are a secured to the upright corner and intermediate posts and will provide positive guidance to the cartons as they are advanced along the compartment. Note also that strip 54 is located at a height corresponding to or adjacent the side edge of the plate. Thus, the presence of such guide strips will prevent an advancing plate or carton from catching or hanging up on an upright in the compartment interior thereby interrupting their advancement from one compartment end to the other. Sheet metal along the interior compartment side may also be used for the same purpose.

It will be appreciated that the apparatus described herein offers significant advantages over the popular and conventional fork lifts, pallet rack storage systems. Thus the instant invention may be used to particular advantage to significantly cut building, refrigeration and breakage costs as well as reduce labor and handling costs. The system also provides positive product rotation, improved quality and inventory control and maximizes cooling and refrigeration efficiency because of increased exposure of goods or cartons to circulating air. These as well as other advantages will be evident to those skilled in the art.

I claim:

1. A method of handling materials utilizing an apparatus having:
   1. a row of flat plates having an upper surface for stacking articles thereon and a bottom surface having means attached thereto for receiving a catch member and which plates lie end to end along the base area of a linear storage compartment on roller means;
   2. a series of adjacent linear storage compartments;
   3. linear and substantially level roller means disposed along the bottom of each of said storage compartments along which said plates may be advanced; and
   4. a shaft and shaft guide means secured to the bottom of each one of said storage compartments and disposed substantially linearly along the length thereof and wherein said shaft is provided with a plurality of catch members thereon for advancing said plates along said roller means, said method comprising the steps:
      a. loading materials on a first plate at a first end of one of said compartments;
      b. pushing or otherwise advancing said first loaded plate along said roller means toward the opposite end of said storage compartment until sufficient space is available on the roller means exposed at the first end of said compartment to place another plate thereon;
      c. repeating steps (a) and (b) until the desired amount of materials and successive plates are present in said compartment; and d. pulling said shaft out from the opposite end of said compartment until said catch members have stopped at said catch member receiving means and further pulling said shaft whereby said loaded plates are advanced until the first loaded plate reaches the opposite end of said compartment.

2. The method of claim 1 including the additional step of unloading materials from said first plate at said opposite compartment end following step (d).

3. The method of claim 2 including the additional step of removing said first unloaded plate from said storage compartment and further advancing materials therealong according to step (d).

* * * * *